US008346256B2

(12) United States Patent
Brueck et al.

(10) Patent No.: US 8,346,256 B2
(45) Date of Patent: Jan. 1, 2013

(54) METHOD OF MULTICAST SERVICE PROVISIONING

(75) Inventors: Stefan Brueck, Nuremberg (DE); Mirko Schacht, Munich (DE); Hans Peter Schefczik, Erlangen (DE)

(73) Assignee: Alcatel Lucent, Paris (FR)

( * ) Notice: Subject to any disclaimer, the term of this patent is extended or adjusted under 35 U.S.C. 154(b) by 583 days.

(21) Appl. No.: 11/340,708

(22) Filed: Jan. 27, 2006

(65) Prior Publication Data

US 2007/0177555 A1   Aug. 2, 2007

(51) Int. Cl.
*H04W 4/00* (2009.01)

(52) U.S. Cl. .................... 455/435.3; 455/67.4; 455/518; 455/520

(58) Field of Classification Search .................. 370/390, 370/332, 335, 329, 232, 342; 455/67.11, 455/513, 512, 69, 522; 725/123; 709/223
See application file for complete search history.

(56) References Cited

U.S. PATENT DOCUMENTS

| | | | | |
|---|---|---|---|---|
| 6,359,902 | B1 * | 3/2002 | Putzolu | 370/466 |
| 6,996,104 | B2 * | 2/2006 | Trossen et al. | 370/390 |
| 2002/0196753 | A1 * | 12/2002 | Famolari | 370/335 |
| 2003/0156540 | A1 * | 8/2003 | Trossen et al. | 370/232 |
| 2003/0157899 | A1 * | 8/2003 | Trossen et al. | 455/69 |
| 2004/0179493 | A1 * | 9/2004 | Khan | 370/332 |
| 2005/0053069 | A1 * | 3/2005 | Lundby | 370/390 |
| 2005/0138671 | A1 * | 6/2005 | Love et al. | 725/123 |
| 2005/0213525 | A1 * | 9/2005 | Grayson et al. | 370/312 |
| 2006/0007887 | A1 * | 1/2006 | Kwon et al. | 370/329 |
| 2006/0007930 | A1 * | 1/2006 | Dorenbosch | 370/390 |
| 2006/0050659 | A1 * | 3/2006 | Corson et al. | 370/310 |
| 2006/0176839 | A1 * | 8/2006 | Frazer et al. | 370/312 |
| 2007/0076715 | A1 | 4/2007 | Bauer et al. | |
| 2007/0133449 | A1 | 6/2007 | Schacht et al. | |
| 2009/0005109 | A1 * | 1/2009 | Nishio et al. | 455/550.1 |

FOREIGN PATENT DOCUMENTS

| | | |
|---|---|---|
| EP | 1 427 131 A2 | 6/2004 |
| WO | WO 03/096149 A | 11/2003 |
| WO | WO 2007/053299 A | 5/2007 |

OTHER PUBLICATIONS

Eusebio P et al: "Management scenarios for multicast groups in enhanced-UMTS" Vehicular Technology Conference, Los Angeles, CA, USA Sep. 26-29, 2004, Sep. 26, 2004, pp. 3045-3049. XP010787214 section II.B.
International Search Report dated Jun. 13, 2007.
3GPP, "Universal Mobile Telecommunications System (UMTS); Radio Resource Control (RRC) Protocol Specification," ETSI TS 125 311, V.5.12.1, Mar. 2005.

* cited by examiner

*Primary Examiner* — Wayne Cai
*Assistant Examiner* — Julio Perez
(74) *Attorney, Agent, or Firm* — Harness, Dickey & Pierce, P.L.C.

(57) ABSTRACT

A method of provisioning multicast services is provided. In an example, the method includes forming a plurality of multicast groups, each of the plurality of multicast groups associated with one of a plurality of first channel quality ranges. A request for a multicast service and an indicator (e.g., a channel quality indicator (CQI)) indicating a channel quality of a mobile unit are received from the mobile unit. The mobile unit is assigned to one of the plurality of multicast groups based on the indicated channel quality and the plurality of first channel quality ranges.

12 Claims, 5 Drawing Sheets

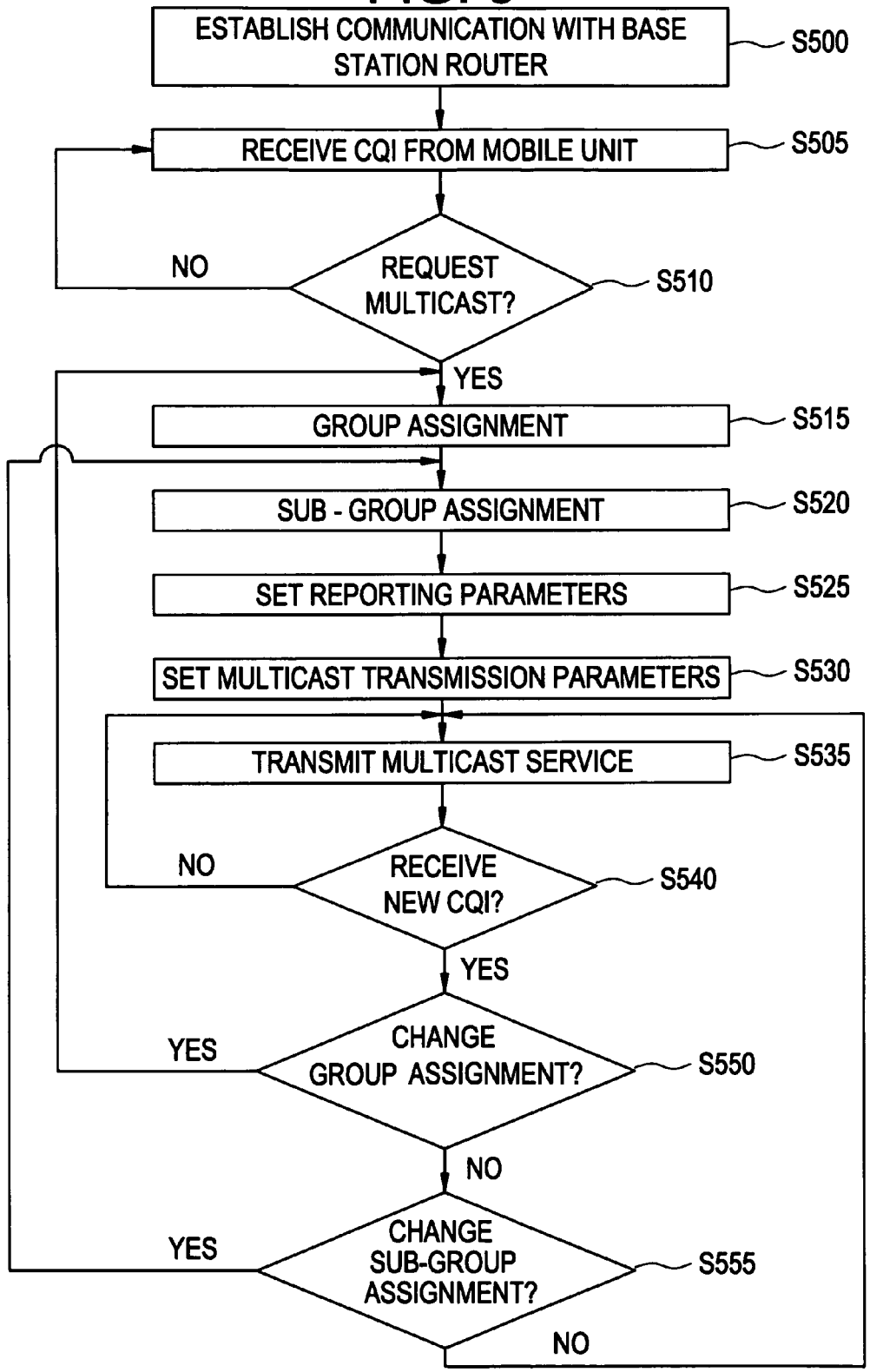

METHOD OF MULTICAST SERVICE PROVISIONING

BACKGROUND OF THE INVENTION

1. Field of the Invention

Example embodiments of the present invention relate generally to communications systems, and, more particularly, to wireless communication systems.

2. Description of the Related Art

Conventional wireless communication systems include one or more base stations or base station routers, which may also be referred to as access points, node-Bs or access networks, for providing wireless connectivity to one or more mobile units, which may also be referred to using terms such as user equipment, subscriber equipment, and access terminals. Examples of mobile units include cellular telephones, personal data assistants, smart phones, text messaging devices, laptop/notebook computers, desktop computers and the like. Each base station may provide wireless connectivity to one or more mobile units, such as the mobile units in a geographical area, or cell, associated with the base station. For example, a base station may provide wireless connectivity to mobile units located in a cell according to a Universal Mobile Telecommunication System (UMTS) specification. Alternatively, a base station router may be used to provide wireless connectivity to the mobile units.

Wireless communication systems may provide multicast services to the mobile units in the system. In a multicast transmission, information in the form of packets is provided by a source, such as a multicast server coupled to the wireless communication system, and the packets are replicated so that identical information may be transmitted concurrently to multiple users. Thus, a single server may provide multicast services concurrently to many mobile units. For example, a single multicast server may provide video streaming, interactive game delivery, news clips, and the like concurrently to several mobile units. Users of mobile units typically subscribe to the multicast services and the mobile units then monitor one or more signaling channels to determine when a multicast transmission may occur. When the mobile unit determines that a multicast transmission is available, the mobile unit may establish a communication channel to receive the multicast transmission.

Conventional multicast service providers deliver information to mobile units over a wireless or air interface using dedicated channels (DCHs) associated with each mobile unit. For example, if several mobile units subscribe to a multicast service provided via a base station, then a dedicated channel is established for each mobile unit and the dedicated channels are used to transmit the multicast packets from the base station to the associated mobile units. However, implementing a multicast service using dedicated channels has a number of drawbacks. For example, each mobile unit consumes resources associated with establishing and/or maintaining the dedicated channel. If a new mobile unit begins transmitting, the corresponding rise in the interference level may force the other mobile units to increase their transmission powers and consume additional resources. Thus, resource utilization scales exponentially with the number of mobile units. Consequently, the total number of mobile units that may receive a multicast service is typically limited by the radio resources available to the multicast service. The restrictions on the number of mobile units that may receive a multicast service may translate into a restriction on the number of potential subscribers, which may in turn limit the potential revenue that may be generated by providing multicast services.

SUMMARY OF THE INVENTION

An example embodiment of the present invention is directed to a method of provisioning multicast services, including forming a plurality of multicast groups, each of the plurality of multicast groups associated with one of a plurality of first channel quality ranges, receiving a request for a multicast service from a mobile unit, receiving an indicator indicating a channel quality of the mobile unit and assigning the mobile unit to one of the plurality of multicast groups based on the indicated channel quality and the plurality of first channel quality ranges.

BRIEF DESCRIPTION OF THE DRAWINGS

The present invention will become more fully understood from the detailed description given herein below and the accompanying drawings which are given by way of illustration only, wherein like reference numerals designate corresponding parts in the various drawings, and wherein:

FIG. 5 illustrates a process for establishing mobile unit assignments to multicast groups according to another example embodiment of the present invention.

DETAILED DESCRIPTION OF EXAMPLE EMBODIMENTS

In order to better understand the present invention, examples of communication systems will be described, followed by methods of establishing multicast groups for provisioning multicast services to mobile units within the communication systems according to example embodiments of the present invention.

First Example Communication System

Figure 1:
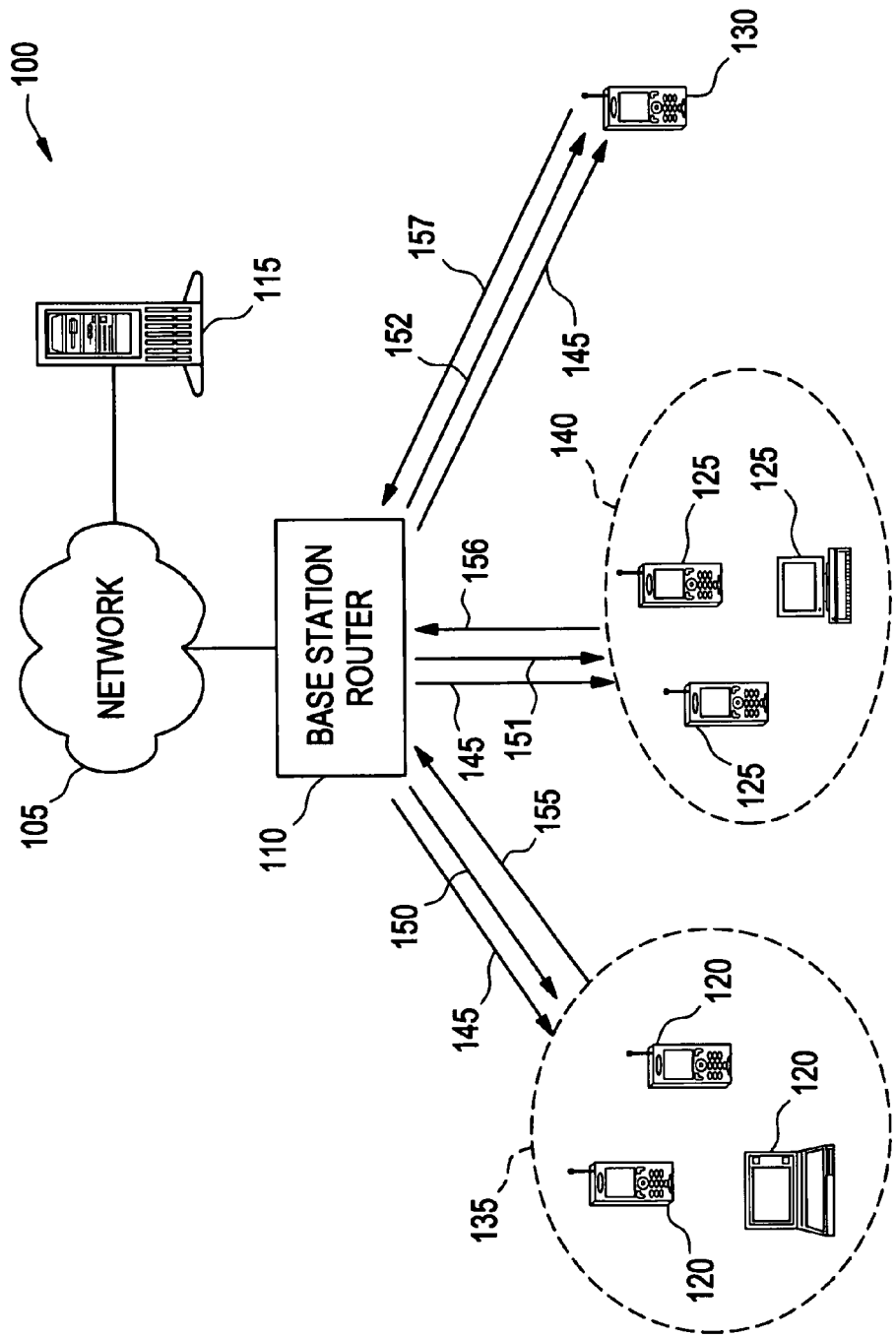
FIG. 1 conceptually illustrates a first example embodiment of a communication system, in accordance with the present invention.

FIG. 1 illustrates a communication system 100 according to an example embodiment of the present invention. In the example embodiment of FIG. 1, the communication system 100 includes a network 105 that is communicatively coupled to a base station router 110. Alternatively, a base station (not shown) may be coupled to the network 105. Accordingly, at least a portion of the network 105 may operate according to wireless communication protocols such as specified in the Third Generation Partnership Project (3GPP) standardization of the Universal Mobile Telecommunication Services (UMTS) wireless communication system. For example, the network 105 may operate according to Release 6 of the 3GPP UMTS wireless communication system. However, it is understood that other example embodiments of the present invention may be directed to networks operating in accordance with wireless communication protocols other than the 3GPP UMTS protocol. For example, in alternative example embodiments of the present invention, at least a portion of the network 105 may operate in accordance with any wireless communications protocol, such as a Code Division Multiple Access (CDMA, CDMA2000) protocol, a Bluetooth protocol, one of the IEEE 802 protocols, etc. Further, portions of the network 105 may operate according to one or more wired communication protocols, such as a Public Switched Telephone Network (PSTN), a Plain Old Telephone System (POTS), etc.

The network 105 is configured to provide multicast services. The term "multicast service" refers to services that may be provided by a single server concurrently to a plurality of users. For example, packets associated with a multicast service may be replicated within the network 105 so that the multicast service may be provided concurrently to a plurality of users. A multicast service may also be referred to as a "point-to-multipoint" service. However, it is understood that a multicast service may alternatively include more than one source of packets, in which case the service may be referred to as a "multipoint-to-multipoint" service. Examples of multicast services may include video streaming, interactive game delivery, news broadcasts, etc. In an example, if the network 105 is configured to operate in accordance with Release 6 of the 3GPP UMTS, multicast services may be provided using a Multicast Broadcast Multimedia Services (MBMS) feature. However, it is understood that other multicast provisioning features may be employed if the network 105 operates in accordance with other wireless communication protocols.

The communication system 100 includes a multicast server 115 that is configured to provide multicast services to mobile units 120, 125, 130 via the network 105 and the base station router 110. However, it is understood that other example embodiments of the present invention may not be limited to a single multicast server 115. Accordingly, in alternative example embodiments of the present invention, any number of multicast servers 115 may be communicatively coupled to the network 105. The mobile units 120, 125, 130 are assumed to have subscribed to one or more of the multicast services provided by the multicast server 115. For example, the mobile units 120, 125 and 130 may be subscribed to one or more multicast services when they are purchased or a user of the mobile units 120, 125 and 130 may subscribe to one or more multicast services at a later time. Techniques for subscribing to the multicast services are known to persons of ordinary skill in the art and will not be described in further detail for the sake of brevity. Identifiers may be associated with the mobile units 120, 125 and 130. For example, High Speed Downlink Shared Channel (HS-DSCH) Radio Network Identifiers (HRNTIs) may be assigned to the mobile units 120, 125 and 130. In an example, the identifiers may be associated with the mobile units 120, 125 and 130 when the mobile units 120, 125 and 130 subscribe to one or more multicast services. The mobile units 120 and 125 may be associated with groups 135 and 140, respectively, and a single identifier is associated with each of the mobile units 120 and 125 in each of the groups 135 and 140, respectively. For example, the mobile units 120 in the group 135 may be subscribed to a first service and may be associated with a first HRNTI and the mobile units 125 in the group 140 may also be subscribed to the first service and may be associated with a second HRNTI that differs from the first HRNTI. However, it is understood that not all of the mobile units 120, 125 and 130 may be associated with one or more of the groups 135 and 140. For example, the mobile unit 130 may be subscribed to the first service but may not be associated with any group. Accordingly, the mobile unit 130 may be associated with its own identifier, such as a third HRNTI. In an example, the identifiers may be provided to the mobile units 120, 125 and 130 using layer-3 (L3) signaling.

The mobile units 120, 125 and 130 monitor a signaling channel 145 provided by the base station router 110 to determine whether or not a multicast service is available. Although the signaling channel 145 is indicated by three arrows in FIG. 1, it is understood that the signaling channel 145 is a single channel being broadcast by the base station router 110 that may be monitored by any device proximate (e.g., in receiving range of) the base station router 110. In an example, the signaling channel 145 is a High Speed Shared Control Channel (HS-SCCH), which may broadcast control information associated with the multicast services. However, it is understood that the base station router 110 may support more than one signaling channel 145 and the mobile units 120, 125 and 130 may monitor one or more signaling channels 145. For example, the base station router 110 may support four or more signaling channels 145 and the mobile units 120, 125 and 130 may monitor up to four signaling channels 145.

When a multicast transmission is scheduled by the multicast server 115, the mobile units 120, 125 and 130 may be notified by broadcasting control information over the signaling channel 145. The control information may include an indication that new data is available, a retransmission request process identifier (e.g., such as a hybrid automatic repeat request (HARQ) process ID), and a Transport Format and Resource Indicator (TFRI). The TRFI may include information associated with the transmission including a transport format for a downlink channel that may indicate a transport block set size, a modulation scheme, one or more channelization codes associated with the downlink channel, etc. Information transmitted over the signaling channel 145 may be masked using the identifiers associated with the mobile units 120, 125 and 130. Accordingly, the mobile units 120 and 125 in the groups 135 and 140, respectively, may be notified of scheduled multicast transmissions using a single identifier, such as a HRNTI, to mask the information transmitted over the signaling channel 145.

The multicast server 115, the network 105, and/or the base station router 110 may provide the scheduled multicast services to the mobile units 120, 125 and 130 over shared channels 150, 151 and 152, respectively. In an example, the shared channels 150, 151 and 152 may be time multiplexed channels. In another example, the shared channel 150 is associated with the group 135, the shared channel 151 is associated with the group 140, and the shared channel 152 is associated with the mobile unit 130. However, it is understood that other example embodiments of the present invention are not limited to three shared channels. Accordingly, in alternative example embodiments of the present invention, the base station router 110 may be capable of providing multicast services over more or less than the illustrated three shared channels 150, 151 and 152.

The shared channels 150, 151 and 152 may be used to provide multicast services to the mobile units 120, 125 and 130, respectively. For example, the shared channel 150 may be used to provide multicast services to the mobile units 120 in the group 135 by transmitting information associated with the multicast service in one or more transmission time intervals (TTI) of a time multiplexed physical channel. In another example, the shared channel 151 may be used to provide multicast services to the mobile units 125 by transmitting information associated with the multicast service in other transmission time intervals (TTI) of the time multiplexed physical channel. In yet another example, the shared channel 152 may be used to provide multicast services to the mobile unit 130 by transmitting information associated with the multicast service in yet other transmission time intervals (TTI) of the time multiplexed physical channel. Accordingly, multicast services may be provided to pluralities of mobile units 120, 125 and 130 using a reduced number of downlink channels relative to techniques that allocate a dedicated channel to each mobile unit designated to receive a multicast transmission.

The mobile units 120, 125, 130 may also provide feedback information over one or more uplink channels 155, 156, 157. In an example, each of the mobile units 120, 125 and 130 provides channel quality information over a High Speed Dedicated Physical Control Channel (HS-DPCCH). For example, each of the mobile units 120, 125 and 130 may provide channel quality information over an HS-DPCCH associated with one or more of the mobile units 120, 125 and 130 using a Channel Quality Indicator (CQI). Accordingly, it will be appreciated that the arrows 155 and 156 may be representative of a plurality of uplink channels associated with the pluralities of mobile units 120 and 125. For example, the arrow 155 may be representative of three HS-DPCCHs associated with the three mobile units 120.

The network 105 may use the channel quality information provided by the mobile units 120, 125 and 130 to allocate radio resources associated with the multicast services. In an example, the network 105 may use the channel quality information to optimize a transport format for transmissions associated with the multicast services over the shared channels 150, 151 and 152. For example, the network 105 may use the channel quality information provided by the mobile units 120 to select a coding/modulation scheme and/or a transport block size to be used for packets transmitted over the shared channel 150. In another example, the network 105 may allocate the radio resources based upon the lowest channel quality associated with one of the mobile units 120, 125 and/or 130 in each of the groups 135 and 140.

In another example embodiment of the present invention, the mobile units 120, 125 and 130 may be associated with one or more of the groups 135 and 140 based upon a data transmission rate and/or a channel quality associated with the mobile units 120, 125 and 130. For example, the mobile units 130 may be subscribed to a multicast service and may be associated with the group 135 because the mobile units 120 have reported a relatively high channel quality and therefore may be associated with a relatively high data transmission rate for the multicast service, such as 16 Quadrature Amplitude Modulation (16QAM). In another example, the mobile units 125 may be associated with the group 140 because the mobile units 125 are subscribed to the multicast service and have reported a channel quality that is sufficient to support High Speed Downlink Packet Access (HSDPA) but not sufficiently high to permit the use of 16QAM modulation for the multicast service. In another example, the mobile units 120, 125, 130 that report relatively poor channel conditions and consequently can only be supported by low rate HSDPA for the multicast service may be allocated a dedicated channel, such as a legacy DCH. For example, the mobile unit 130 may be located near an edge of the cell associated with the base station router 110 and may therefore be assigned a legacy DCH for receiving multicast services. Handoff of the mobile unit 130 to a neighboring cell may be facilitated by assigning a legacy DCH to the mobile unit 130, as will be discussed in detail below. Further, example methods of assigning mobile units to one or more multicast groups will be discussed later in greater detail.

The mobile units 120, 125 and 130 may provide acknowledgment feedback (e.g., using the uplink channels 155, 156, 157). In an example, the acknowledgment feedback may include positive acknowledgment (ACK) and/or negative acknowledgment (NACK) messages. When the base station router 110 receives a NACK message, one or more packets associated with the NACK message may be retransmitted to one or more of the mobile units 120, 125 and 130. In another example, a feedback power associated with the acknowledgment messages may be adjusted so that the base station router 110 may receive the NACK messages, but not the ACK messages. For example, the transmission power for ACK messages may be set relatively low and the transmission power for NACK messages may be set relatively high.

However, it will be appreciated that providing acknowledgment feedback is an optional feature and may not be included in all example embodiments of the communication system 100. Furthermore, other techniques for providing the ACK/NACK messages may be used.

Second Example Communication System

Figure 2:
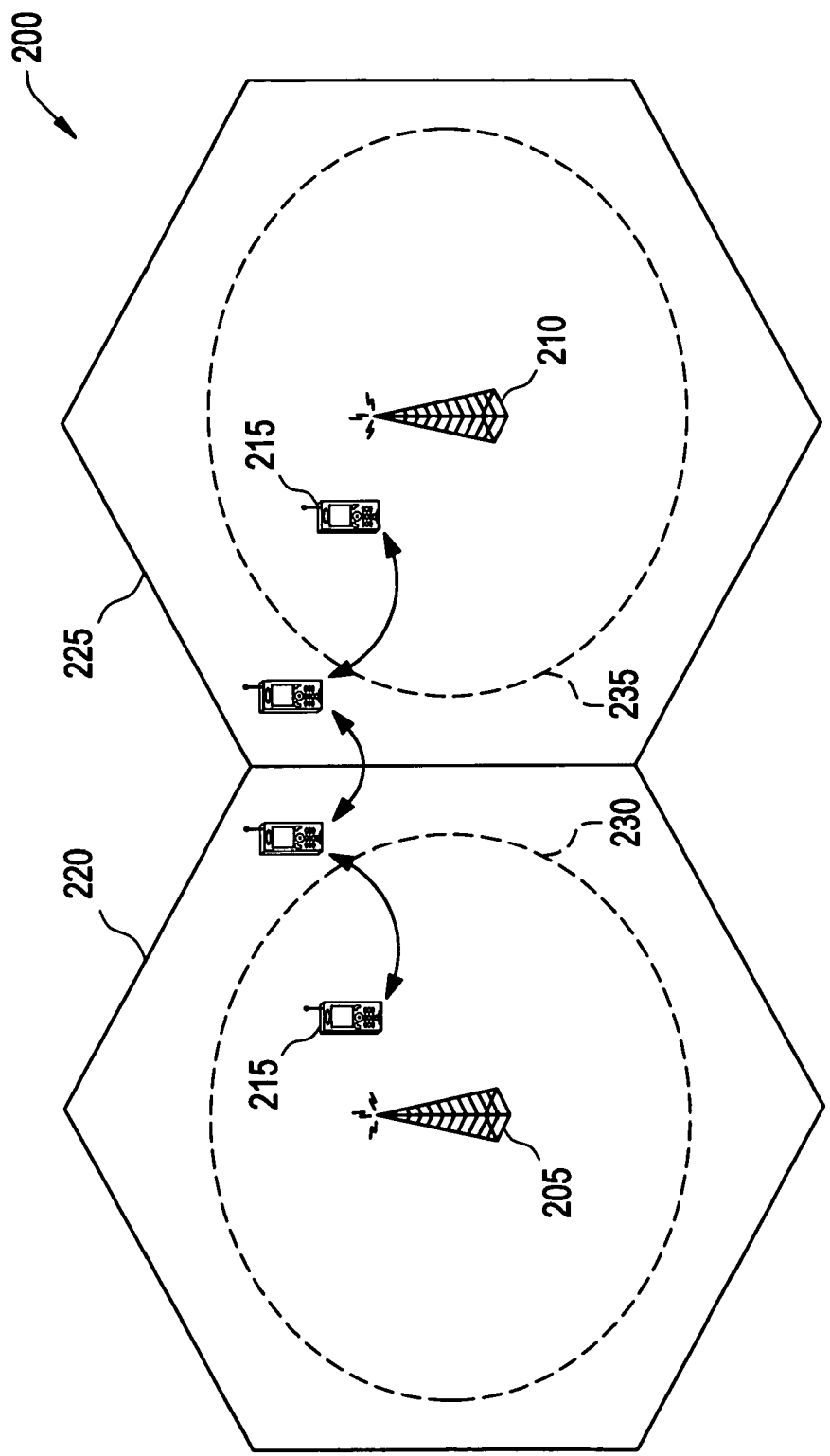
FIG. 2 conceptually illustrates a second example embodiment of a communication system, in accordance with the present invention.

FIG. 2 illustrates a communication system 200 according to another example embodiment of the present invention. In the example embodiment of FIG. 2, the communication system 200 includes two base station routers 205 and 210 that may be used to provide wireless connectivity to a mobile unit 215 within geographic areas or cells 220 and 225, respectively. However, it will be appreciated that example embodiments of the present invention are not to be construed as limited to the two base station routers 205 and 210 providing wireless connectivity to two cells 220 and 225, respectively. Rather, it is understood that in alternative example embodiments of the present invention, the wireless communication system 200 may include any number of base station routers that may provide wireless connectivity to any number of cells. In the example embodiment of FIG. 2, the wireless communication system 200 is configured to provide one or more multicast services via the base station routers 205 and 210.

Initially, the mobile unit 215 is located in an area proximate the base station router 205 (as indicated by the dashed circle 230) where the mobile unit 215 is capable of receiving multicast service transmissions at a relatively high channel quality and/or a relatively high data rate. However, it will be appreciated that the channel quality and/or data rate may not be determined solely based on proximity to the base station router 205. For example, buildings, geographical features, and/or other obstructions may also affect the channel quality and/or the data rate available to the mobile unit 215. Thus, the area 230 may include various irregularities during actual use, and may not be embodied as a circle. The mobile units 215 may be associated with a group of mobile units (not shown) that all share a relatively high channel quality and/or a relatively high data rate and therefore receive multicast service transmissions over a single shared channel, as described above.

The mobile unit 215 may then move outside of the region 230 and into an area proximate an edge of the cell 220 where the channel quality and/or the data rate may decrease. The mobile unit 215 may therefore be removed from the group of mobile units having relatively high channel quality and/or data rate and may instead be associated with a dedicated channel, such as a legacy DCH. The wireless communication system 200 may then provide the multicast service transmissions over the dedicated legacy DCH. If the mobile unit 215 then leaves the cell 220 and roams into the cell 225, the mobile unit 215 may be handed off from the dedicated legacy DCH associated with the base station router 205 to a dedicated legacy DCH provided by the base station router 210. Techniques for handing off the mobile unit 215 from the base station router 205 to the base station router 210 are known to persons of ordinary skill in the art and will not be discussed in further detail for the sake of brevity.

Following the handoff from the base station router 205 to the base station router 210, the mobile unit 215 may be outside of a region 235 where the mobile unit 215 is capable of receiving multicast service transmissions via the base station router 210 at a relatively high channel quality and/or a relatively high data rate. The mobile unit 215 may therefore be associated with the dedicated channel received from the base station router 210, such as the legacy DCH described above. However, the mobile unit 215 may continue to roam into the region 235 where the mobile unit 215 is capable of receiving multicast service transmissions via the base station router 210 at a relatively high channel quality and/or relatively high data rate. Accordingly, the mobile unit 215 may be associated with a group (not shown) of mobile units that are also capable of receiving multicast service transmissions at the relatively high channel quality and/or relatively high data rate. The process of assigning and/or adjusting an assignment of mobile units to one or more multicast groups based on mobile unit channel quality characteristics, described above in a general fashion, will be described in greater detail below.

Examples Provisioning of Multicast Services

Figure 3:
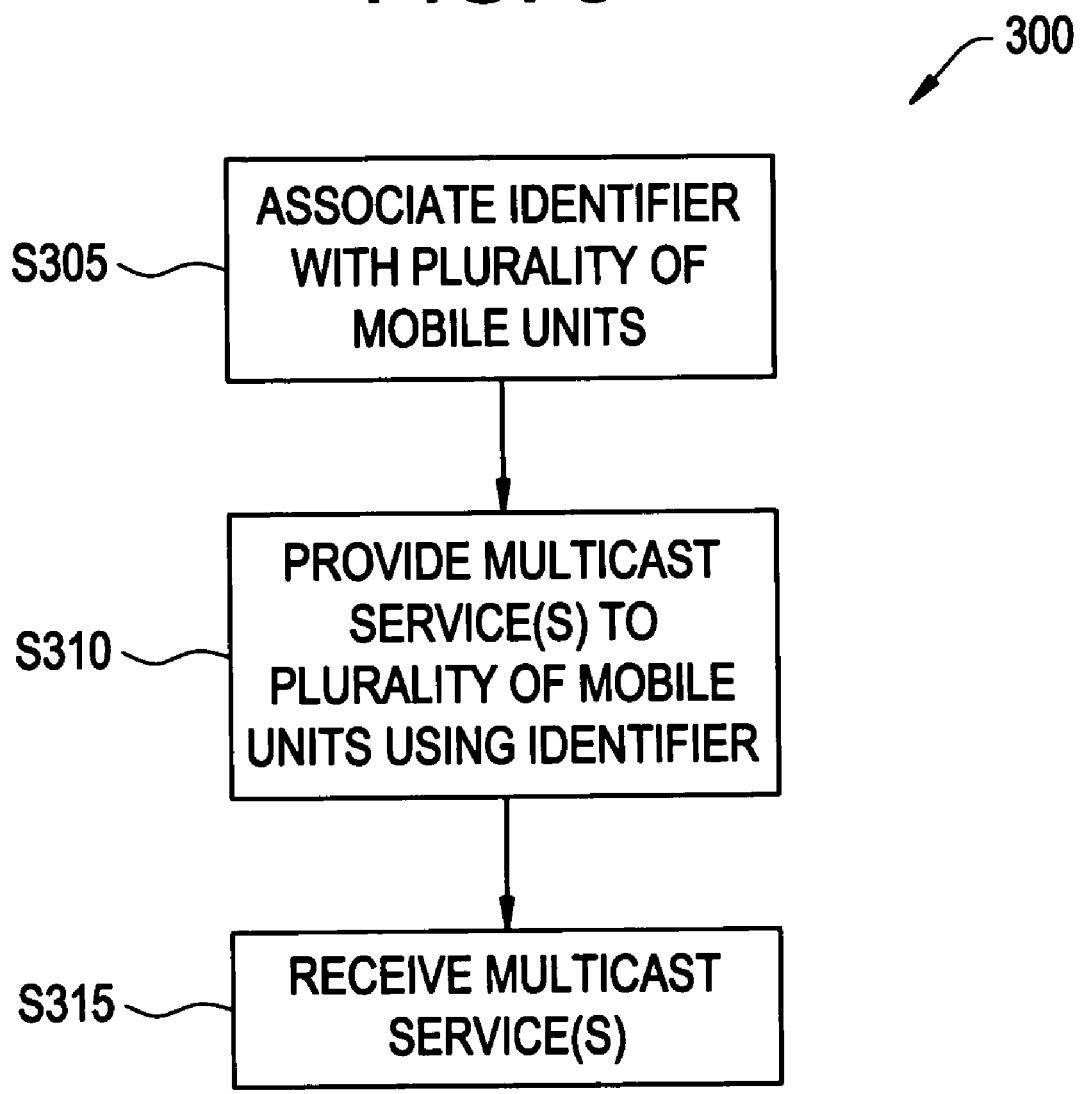
FIG. 3 conceptually illustrates one example embodiment of a method for providing multicast services to a plurality of mobile users, in accordance with the present invention.

FIG. 3 illustrates a process of provisioning multicast services to a plurality of mobile units according to another example embodiment of the present invention.

In the example embodiment of FIG. 3, an identifier is associated (at step S305) with a plurality of mobile units. For example, an HRNTI may be associated with a plurality of mobile units having similar channel qualities and/or data rates. Multicast services may then be provided (at step S310) to the plurality of mobile units associated with the identifier. For example, the mobile units may be notified of a scheduled multicast service transmission over a signaling channel using information indicative of the identifier as a mask. The notification may include information indicating a shared channel that will be used to transmit packets associated with the multicast service, as well as various control parameters associated with the shared channel. The mobile units may then receive (at step S315) one or more multicast services over the shared channel.

Example Assignment of Mobile Units to Multicast Groups for Multicast Service Provisioning An example of assigning mobile units to one of a plurality of multicast groups will now be given. In the following example, while four multicast groups are described below and illustrated in FIG. 4, it is understood that other example embodiments may include any number of multicast groups.

Figure 4:
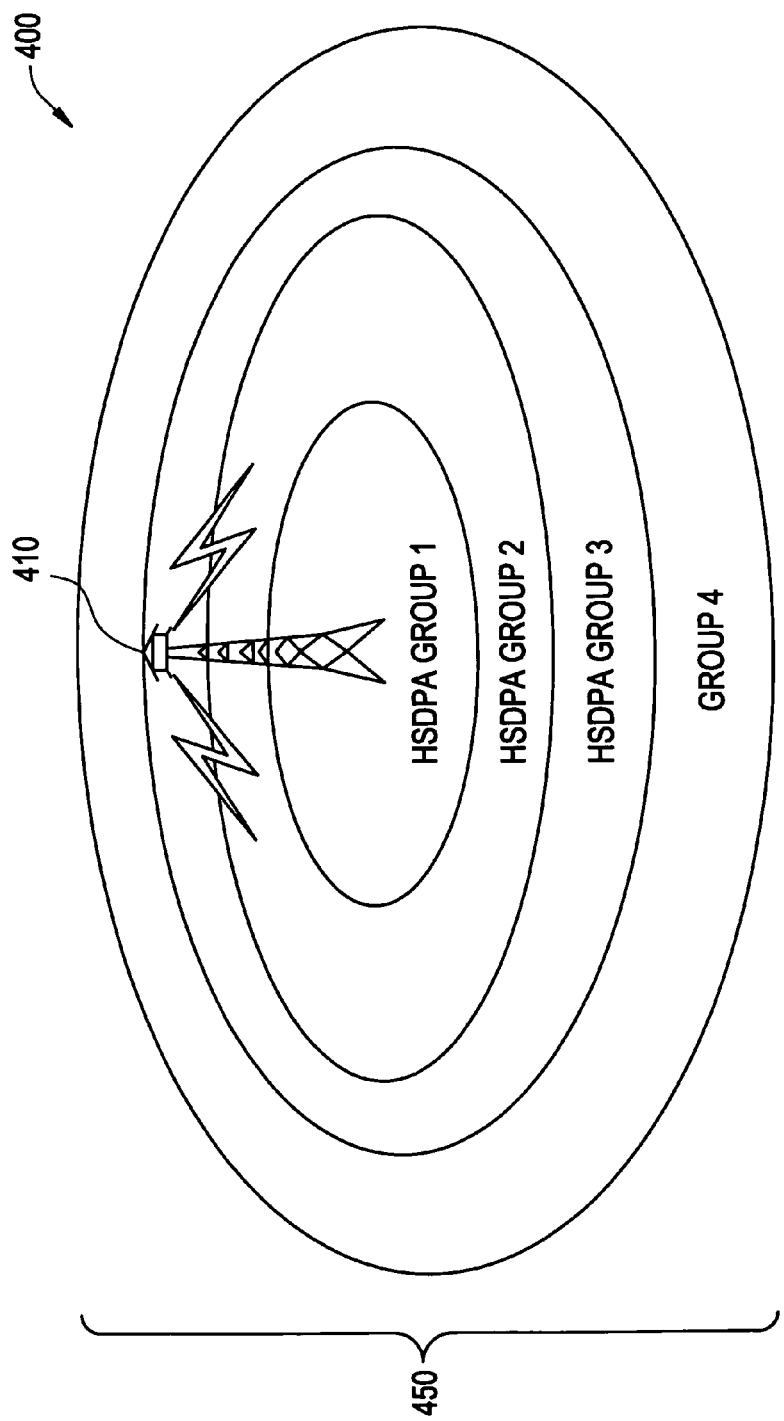
FIG. 4 illustrates a communication system including a base station router providing wireless service to mobile units within a cell having a plurality of multicast groups according to another example embodiment of the present invention.

FIG. 4 illustrates a communication system 400 including a base station router 450 providing wireless service to mobile units within a cell 450 having a plurality of multicast groups according to another example embodiment of the present invention. The plurality of multicast groups includes multicast groups 1, 2, 3 and 4. Each of the multicast groups 1, 2, 3 and 4 may be associated with a plurality of mobile units subscribing to the same multicast service (e.g., streaming video). The different multicast groups are generally associated with different levels of multicast service quality, with multicast group 1 receiving the highest quality multicast service and multicast group 4 receiving the lowest quality multicast service. In the example of streaming video, the different levels of multicast service quality may be demonstrated by the mobile units of multicast group 1 receiving higher resolution video than multicast group 2, multicast group 2 receiving higher resolution video than multicast group 3, and so on.

As discussed above, mobile unit assignment to one of the four multicast groups 1, 2, 3 and 4 may be implemented based on a common HRNTI (e.g., shared by the members of a respective multicast group). Further, in the example embodiment of FIG. 4, multicast group 4 is configured for multicast service over legacy DCHs, while multicast groups 1, 2 and 3 are configured to receive multicasts over HSDPA at different levels of quality. Accordingly, a portion of the cell 450 (i.e., corresponding to the region of the multicast group 4) is provided the multicast service in a conventional fashion.

FIG. 5 illustrates a process for establishing mobile unit assignments to multicast groups according to another example embodiment of the present invention.

In step S500, a mobile unit establishes a connection with the BSR 410 of FIG. 4, as is well known in the art. Periodically, in accordance with established protocols, the mobile unit sends a channel quality indicator (CQI) to the BSR 410 in step S505. The mobile unit monitors available multicast services and determines whether to subscribe to one or more multicast services in step S510. If the mobile unit determines not to subscribe to any available multicast services, the process returns to step S505 and waits for a next CQI. Otherwise, if the mobile unit subscribes to a multicast service, the process advances to step S515.

In step S515, the BSR 410 assigns the mobile unit requesting the multicast service to one of the multicast groups 1, 2, 3 and 4. In an example, the BSR 410 may initially assign the mobile unit to a default multicast group (e.g., multicast group 4 configured for legacy DCH provisioning). In another example, the BSR 410 evaluates the most recently received CQI (see step S505) to determine the multicast assignment. Each of the multicast groups 1, 2, 3 and 4 are associated with a given CQI range, and the BSR 410 assigns the mobile unit to the multicast group with a range including the channel quality indicated by the most recently received CQI.

Once the mobile unit has been assigned to a multicast group, the BSR 410 again evaluates the most recently received CQI to determine a sub-group assignment for the mobile unit in step S520. Each of the multicast groups 1, 2, 3 and 4 include a plurality of sub-groups. The sub-groups are defined by CQI threshold ranges, similar to the establishment of the multicast groups. However, the CQI ranges of the sub-groups collectively span the CQI range of their respective multicast group. Accordingly, each sub-group of a given multicast group has a CQI range which is less than the range of the entire multicast group.

With respect to the example process of FIG. 5, three distinct sub-groups for each of the multicast groups 1, 2, 3 and 4 will be hereinafter described. However, it is understood that different numbers of sub-groups may be employed in other example embodiments of the present invention. It is further understood that each of the multicast groups 1, 2, 3 and 4 need not include the same number of sub-groups in other example embodiments of the present invention.

Hereinafter, each of the multicast groups 1, 2, 3 and 4 will be described as including a "high" sub-group, a "medium" sub-group, and a "low" sub-group. The high sub-group is assigned the mobile units with the highest most recently received CQIs within the multicast group, the low sub-group is assigned the mobile units with the lowest most recently received CQIs within the multicast group, and the medium sub-group is assigned the mobile units having a middling (e.g., between the thresholds of the low and high sub-groups) most recently received CQIs. The thresholds establishing the CQI ranges for the sub-groups may be either dynamic (e.g., established based on changing system conditions) or static (e.g., set to default values irrespective of system conditions).

Once the mobile unit is assigned to both a multicast group and an associated sub-group in steps S515 and S520, the BSR 410 instructs the mobile unit to operate in accordance with reporting parameters associated with its assigned sub-group in step S525. For example, the BSR 410 may send the reporting parameters to the mobile unit on a shared downlink control channel. The reporting parameters include a CQI reporting interval, a CQI power offset, and an ACK/NACK power offset on HS-DPCCH. The CQI reporting interval is the interval in which the mobile unit transmits the CQI to the BSR 410 (e.g., as in step S505). The CQI power offset is the relative power level at which the CQI is transmitted from the mobile unit to the BSR 410. The ACK/NACK power offset on HS-DPCCH is the relative power level at which ACK/NACKs are transmitted from the mobile unit to the BSR 410.

The corresponding sub-groups among the different multicast groups may be non-uniform. In other words, the "high" sub-group of multicast group 1 may be associated with different reporting parameters than the "high" sub-groups of at least one other multicast group, and so on.

Table 1 (below) illustrates example reporting parameters for the sub-groups of multicast group 1.

TABLE 1

| Sub-group | Multicast Group 1 | | |
| --- | --- | --- | --- |
| | High | Medium | Low |
| CQI reporting interval | Low | Low | Medium |
| CQI power offset | Low | Low | Medium |
| ACK/NACK power offset on HS-DPCCH | Low | Low | High |

Referring to Table 1, the high sub-group of multicast group 1 transmits the CQI at a low interval and a low power level and transmits the ACK/NACK power offsets at a low power level, and so on. The reporting parameters set forth in Table 1 may be ideally suited towards operating in "static" communication systems, where mobile units are generally stationary and/or slow moving. Under the assumption that the communication system 400 is static, the reporting parameters set forth in Table 1 may be efficient in reducing system interference because a change in multicast group assignments is unlikely for the medium and high sub-groups (e.g., because "upward" mobility to a higher quality multicast group is not possible since multicast group 1 is the highest quality multicast group). However, since mobile units may be "downgraded" to lower multicast groups (e.g., multicast group 2, 3 or 4), the mobile unit's of the low sub-group report parameters at higher frequency and powers because the mobile units assigned to the low sub-group are more likely to be reassigned (e.g., downgraded to multicast group 2, 3, etc.).

Table 2 (below) illustrates example reporting parameters for the sub-groups of multicast group 2.

TABLE 2

| Sub-group | Multicast Group 2 | | |
| --- | --- | --- | --- |
| | High | Medium | Low |
| CQI reporting interval | Medium | Low | Medium |
| CQI power offset | Medium | Low | Medium |
| ACK/NACK power offset on HS-DPCCH | Low | Low | High |

Accordingly, referring to Table 2, the high sub-group of multicast group 2 transmits the CQI at a medium interval and a medium power level and transmits the ACK/NACK power offsets at a low power level, and so on. Like Table 1 as discussed above, the reporting parameters set forth in Table 2 may be ideally suited towards operating in "static" communication systems, where mobile units are generally stationary and/or slow moving. Under the assumption that the communication system 400 is static, the reporting parameters set forth in Table 2 may be efficient in reducing system interference because a change in multicast group assignments is unlikely for the medium sub-group (e.g., because the low and high sub-groups are more likely to have mobile units being "downgraded" or "upgraded", respectively, at the group level). However, since mobile units may be either "downgraded" to lower multicast groups (e.g., multicast groups 3 or 4) or "upgraded" (e.g., to multicast group 1), both the low and high sub-groups report parameters at a higher frequency and power because their respective mobile units are more likely to undergo group reassignment (e.g., "upgraded" or "downgraded").

From the above-description of the sub-group reporting parameters of the sub-groups of multicast groups 1 and 2, it will be readily apparent how the reporting parameters associated with the sub-groups of multicast groups 3 and 4 may be assigned. For example, reporting parameters for the sub-groups of multicast group 3 may generally resemble those of Table 2 (e.g., because both upward and downward multicast group reassignment are possible). In another example, reporting parameters for the sub-groups of multicast group 4 may be inversely related to Table 1, such that the reporting parameters of the "low" sub-group of multicast group 4 generally correspond with the "high" sub-group parameters of multicast group 1 as set forth in Table 1, and so on (e.g., because downward multicast group reassignment is not possible from multicast group 4 and upward multicast group reassignment is not possible from multicast group 1).

Returning to step S525 of FIG. 5, after the reporting parameters are assigned to the mobile unit, the process advances to step S530. In step S530, the BSR 410 determines transmission parameters for multicast service provisioning to each of the multicast groups 1, 2, 3 and 4 based on the low sub-group of the multicast groups 1, 2, 3 and 4, respectively. The BSR 410 analyzes the most recently received CQIs from each of the mobile units within each of the low sub-groups. The BSR 410 determines the best available transmission parameters (e.g., transmission power levels, the transport format determined by the HSDPA scheduler at the BSR 410). Generally, if transmission parameters are suitable for the low sub-group of a given multicast group, the transmission parameters will likewise be suitable for the medium and high sub-groups of the multicast group. Determining transmission parameters for multicast provisioning based on CQIs is well-known in the art and will not be described further for the sake of brevity.

In step S535, the BSR 410 transmits multicast services to the mobile units assigned to one of multicast groups 1, 2, 3 and 4. While maintaining the streaming multicast transmission, the BSR 410 continues to monitor and evaluate CQIs received from the mobile units in the respective multicast groups in step S540. If no new CQIs are received, the BSR 410 takes no action and continues the multicast transmission in accordance with step S535. Otherwise, if a new CQI is received from one of the mobile units assigned to one of the multicast groups 1, 2, 3 or 4 in step S540, the process advances to step S550.

In step S550, the BSR 410 compares the CQI received at step S540 with the CQI range of the multicast group to which the mobile unit is currently assigned. If the received CQI is outside the CQI range of the mobile unit's currently assigned multicast group, the process returns to step S515 and the BSR 410 assigns the mobile unit to a new multicast group. Otherwise, if the received CQI remains within the CQI range for the mobile unit's currently assigned multicast group, the process advances to step S555.

In step S555, the BSR 410 compares the CQI received at step S540 with the CQI range of the sub-group to which the mobile unit sending the received CQI is currently assigned. If the received CQI is outside the CQI range of the mobile unit's current sub-group, the process returns to step S520 and the BSR 410 assigns the mobile unit to a new sub-group. Otherwise, if the received CQI remains within the CQI range for the mobile unit's current sub-group, the process returns to step S535 and the BSR 410 continues to multicast with no changes.

The numbers of sub-groups and multi-task groups and the reporting parameters constitute design criteria which may change based on characteristics of the communication system 450. For example, Tables 1 and 2 illustrate example parameters which may be more suited to "static" systems as compared to "dynamic" systems. In other words, the number of reconfigurations or group reassignments may become wasteful and problematic if the CQIs sent by mobile units subscribing to multicast services vary dramatically from one CQI to the next. Accordingly, the design criteria may be changed based on an expectation of how "static" or how "dynamic" the communication system 450 will function in practice.

In an example, if the communication system 450 is expected to be very dynamic, the number of multicast groups and/or sub-groups may be reduced because this may reduce the number of reconfigurations or group/sub-group reassignments during the multicast service provisioning. The design criteria may alternatively be adjusted by adapting CQI or ACK/NACK power offsets and reporting intervals to the expectation of CQI variance in the system. For example, in a highly dynamic communication system, the reporting intervals may be shortened and the power offsets may be increased. In another example, the low sub-group CQI range may be increased (e.g., in one or more of the multicast groups) to protect the system against a "worst" user or outlier (e.g., because the transmission parameters are set based on the low sub-group in step S530). A skilled system designer will readily see the adjustments and variations which may be made in response to specific design problems, and further examples of static/dynamic system compensation have been omitted for the sake of brevity.

Example embodiments of the present invention being thus described, it will be obvious that the same may be varied in many ways. For example, while above-described with respect to UMTS, it is understood that other example embodiments of the present invention may be applied to any wireless communication system operating in accordance with any wireless communication protocol. Further, while above-described example embodiments of the present invention employ particular numbers of multicast groups, sub-groups, power offset ranges, reporting interval ranges, etc., it is understood that other example embodiments of the present invention may be scaled to include any number of such parameters.

Such variations are not to be regarded as a departure from the example embodiments of the invention, and all such modifications are intended to be included within the scope of the invention.

We claim:

1. A method of provisioning multicast services, comprising:
    forming a plurality of multicast groups, each of the plurality of multicast groups associated with one of a plurality of different first channel quality ranges and one of a plurality of different multicast service levels;
    forming a plurality of sub-groups for each of the plurality of multicast groups, each of the plurality of sub-groups associated with one of a plurality of different second channel quality ranges;
    assigning a set of reporting parameters for each of the plurality of sub-groups for each multicast group, the set of reporting parameters including at least one of a channel quality indicator (CQI) reporting interval, a CQI power offset, an acknowledgement (ACK) power offset and a non-ACK (NACK) power offset;
    receiving a request for a multicast service from a mobile unit;
    receiving an indicator indicating a channel quality of the mobile unit;
    assigning the mobile unit to one of the plurality of multicast groups according to the channel quality range among the plurality of different first channel quality ranges within which the indicated channel quality is located;
    assigning the mobile unit to one of the plurality of sub-groups associated with the assigned multicast group according to the channel quality range among the plurality of different second channel quality ranges within which the indicated channel quality is located; and
    transmitting the set of reporting parameters corresponding to the assigned sub-group to the mobile unit.

2. The method of claim 1, wherein the indicator is a channel quality indicator (CQI).

3. The method of claim 1, wherein the assigning step includes comparing the indicated channel quality with the plurality of first channel quality ranges and assigning the mobile unit to the multicast group having the first channel quality range including the indicated channel quality.

4. The method of claim 1, wherein the assigning step includes:
    comparing the indicated channel quality with the plurality of second different channel quality ranges and
    assigning the mobile unit to the sub-group having the second channel quality range including the indicated channel quality.

5. The method of claim 1, wherein the plurality of second channel quality ranges collectively constitutes the first channel quality range of the assigned multicast group.

6. The method of claim 1, wherein the set of reporting parameters establish reporting guidelines for the mobile unit to operate in accordance with during the multicast service provisioning.

7. The method of claim 1, wherein
the plurality of sub-groups for each of the plurality of multicast groups includes a lower sub-group and a higher sub-group, the lower sub-group including mobile units with lower reported channel quality indicators (CQIs) than the higher sub-group.

8. The method of claim 7, wherein multicast transmission parameters for each of the plurality of multicast groups are established based on the CQIs of the lower sub-group of the respective multicast group.

9. The method of claim 8, wherein the multicast transmission parameters include at least one of a transmission power level for the multicast service provisioning and a transport format of the multicast service provisioning.

10. The method of claim 7, further comprising:
at least one intervening sub-group including mobile units associated with CQIs lower than the higher sub-group and higher than the lower sub-group.

11. The method of claim 1, further comprising:
reassigning the mobile unit to a different multicast group based on a newly reported indicator indicating a different channel quality for the mobile unit.

12. The method of claim 11, further comprising:
reassigning the mobile unit to a different sub-group based on a newly reported indicator indicating a different channel quality received from the mobile unit.

* * * * *